No. 683,777. Patented Oct. 1, 1901.
J. A. LARSON.
FERTILIZER DISTRIBUTER.
(Application filed June 11, 1901.)
(No Model.) 4 Sheets—Sheet 1.

WITNESSES:

INVENTOR
John A. Larson
BY
ATTORNEYS

No. 683,777. Patented Oct. 1, 1901.
J. A. LARSON.
FERTILIZER DISTRIBUTER.
(Application filed June 11, 1901.)

(No Model.) 4 Sheets—Sheet 2.

WITNESSES:

INVENTOR
John A. Larson
BY
ATTORNEYS

No. 683,777. Patented Oct. 1, 1901.
J. A. LARSON.
FERTILIZER DISTRIBUTER.
(Application filed June 11, 1901.)
(No Model.) 4 Sheets—Sheet 3.
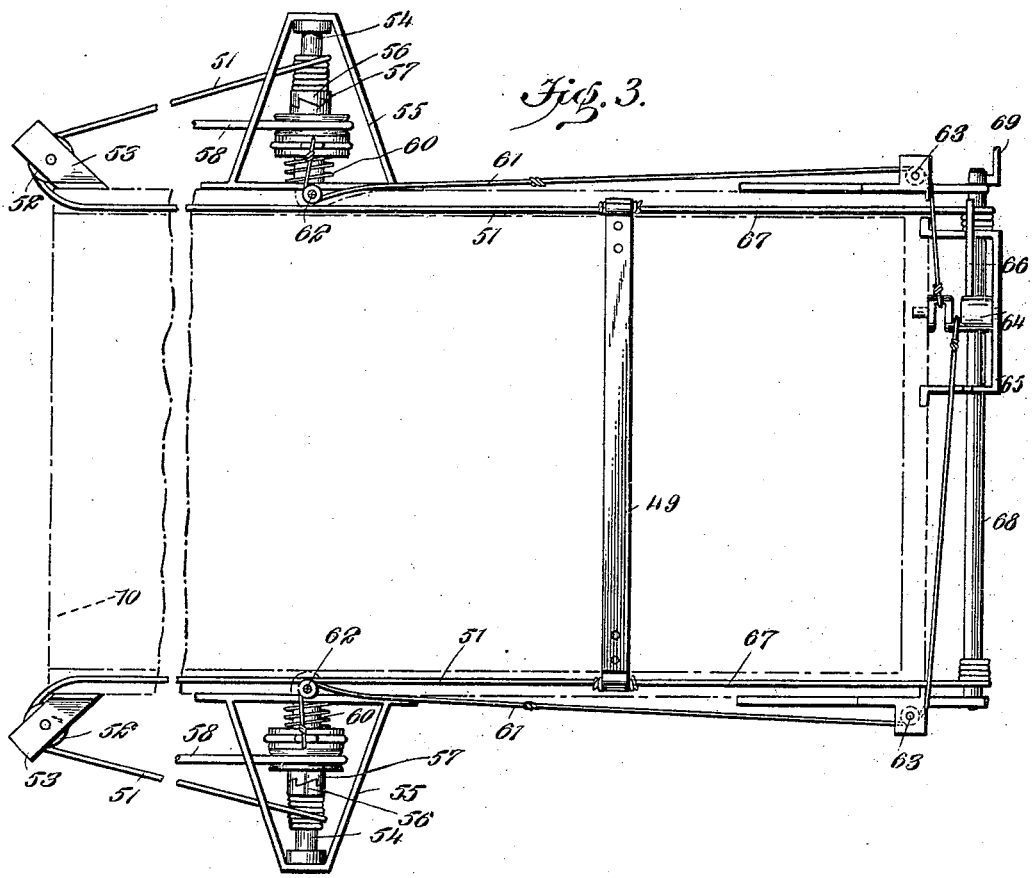
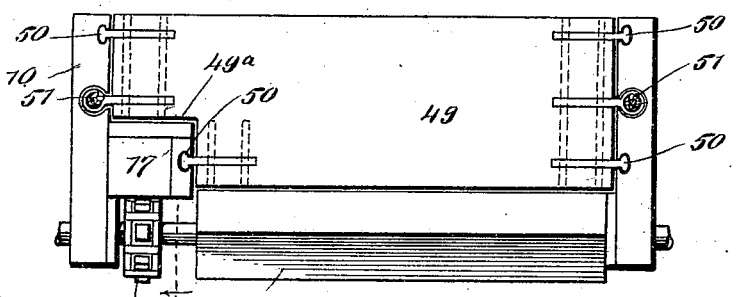

No. 683,777.  
J. A. LARSON.  
FERTILIZER DISTRIBUTER.  
(Application filed June 11, 1901.)  
Patented Oct. 1, 1901.

(No Model.)  
4 Sheets—Sheet 4.

WITNESSES:  
INVENTOR  
John A. Larson  
BY  
ATTORNEYS

UNITED STATES PATENT OFFICE.

JOHN A. LARSON, OF HAYFIELD, MINNESOTA.

FERTILIZER-DISTRIBUTER.

SPECIFICATION forming part of Letters Patent No. 683,777, dated October 1, 1901.

Application filed June 11, 1901. Serial No. 64,114. (No model.)

*To all whom it may concern:*

Be it known that I, JOHN A. LARSON, a citizen of the United States, and a resident of Hayfield, in the county of Dodge and State of Minnesota, have invented a new and Improved Fertilizer-Distributer, of which the following is a full, clear, and exact description.

This invention relates to an apparatus for spreading or sowing manure and other similar material over fields; and it comprises a vehicle provided with certain novel devices for gradually spreading the material as the vehicle moves.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1:
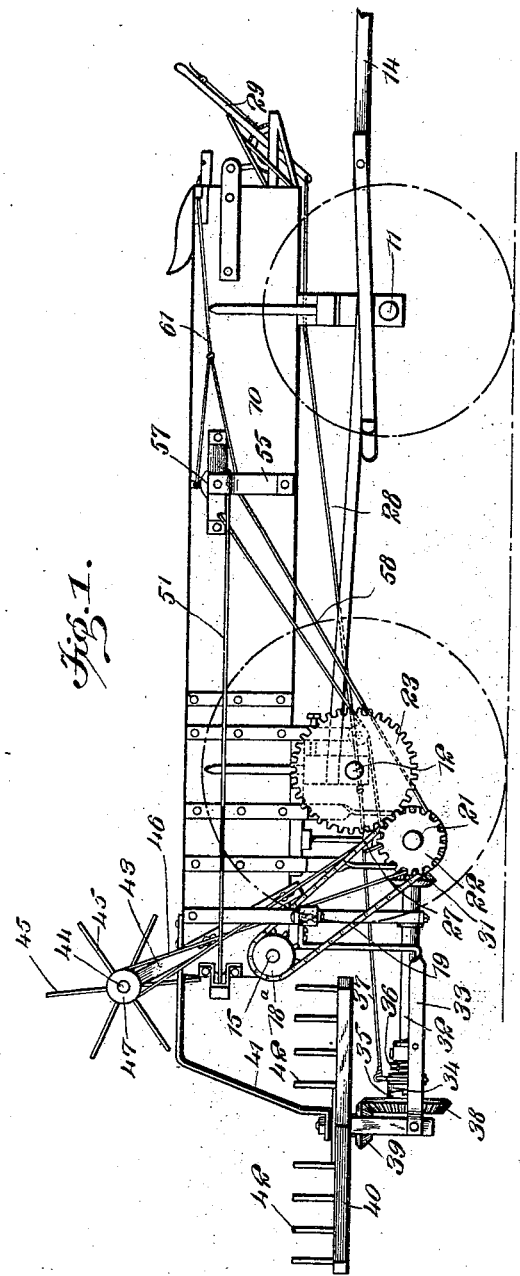
Figure 2:
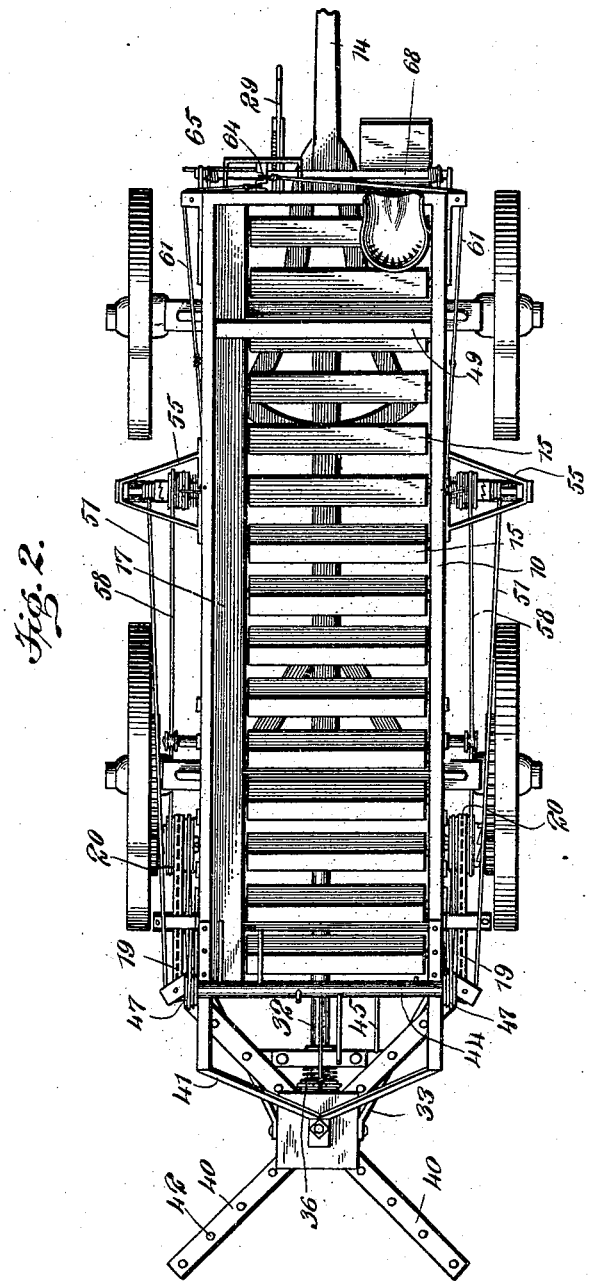
Figure 5:
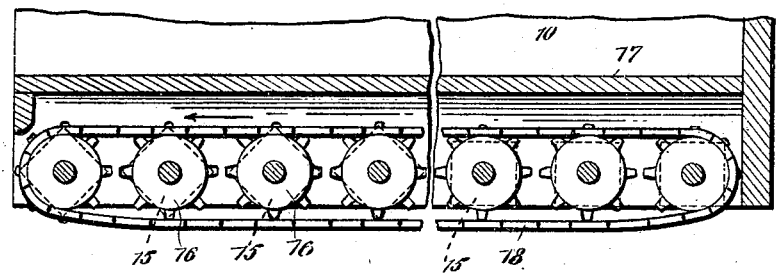
Figure 6:
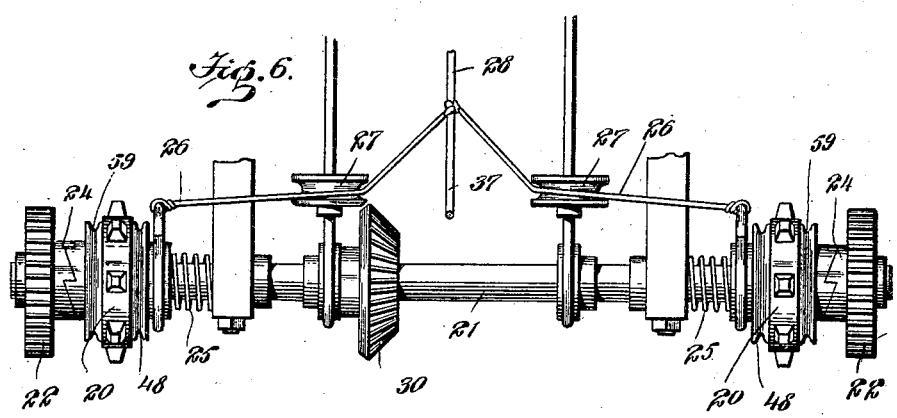

Figure 1 is a side elevation of the invention. Fig. 2 is a plan view thereof. Fig. 3 is a fragmentary plan view showing the mechanism for feeding the material toward the rear of the vehicle. Fig. 4 is a rear elevation of the body of the vehicle. Fig. 5 is a sectional elevation showing the means for driving the roller-bottom of the wagon, and Fig. 6 is a detail view showing the devices for throwing the spreaders into and out of gear.

The body 10 of the apparatus is mounted on two wheeled axles 11 and 12, and is furnished with any suitable draft mechanism 14 for the attachment of a team or other means of moving the spreader. The bottom of the body 10 is made up of a number of transverse rollers 15, which are angular in cross-section and mounted to turn continuously. Each of these rollers is provided at one end with a sprocket-wheel 16, said sprocket-wheels being arranged under a ledge 17, formed in the body 10 and running longitudinally along the same at one of its inner sides. (See Figs. 2 and 4.) Over the sprocket-wheels 16 a chain 18 runs, thus driving all of the rollers 15 together. These rollers constitute the bottom of the body 10, and by their turning movement the material in the body is fed steadily rearward. The rearmost roller 15 has its trunnions extended beyond the sides of the body 10 and carries sprocket-wheels 18ª, over which run chains 19. (See Fig. 2.)

These chains 19 are driven from sprocket-wheels carried on clutch members 20, said members being mounted loosely on the end portions of a rotary shaft 21, which is arranged under the body 10 and provided with pinions 22 in mesh with spur-gears 23, fastened to the wheels of the rear axle 12 and turning therewith. Therefore when the vehicle is drawn forward the shaft 21 is driven, and the movement of this shaft is transmitted to the rollers 15, forming the bottom of the body 10.

The clutch members 20 work with clutch members 24, which are fastened to the shaft 21, and the members 20, being loose, will not be driven except when they are in engagement with the members 24. Springs 25 serve to press into engagement the parts 20 and 24, and these parts are thrown out of action by means of cords or other flexible connections 26, which are connected, respectively, with the clutch members 20 and pass inward over guide-pulleys 27, suitably mounted on the framing of the apparatus, where they are joined to a longitudinally-extending cord 28, running forwardly to the front of the body portion and connected with a hand-lever 29. By throwing this hand-lever the clutch members 20 may be moved out of mesh with the members 24, and by reversing the hand-lever the springs 25 will be allowed to engage the members 20 and 24.

Fastened to the shaft 21 at approximately its middle portion is a bevel-gear 30, in mesh with a gear 31, fastened to a shaft 32, which extends longitudinally of the machine rearward of the shaft 21 and is suitably mounted in a framing 33, fastened to the body 10. This shaft 32 has a clutch member 34 suitably mounted thereon, such member working with a clutch member 35 on the shaft. A spring 36 acts to engage the parts 34 and 35, and these parts may be disengaged through the medium of a cord 37, which is fastened to the clutch member 34 and extended forwardly and joined to the cord 28, as best shown in Fig. 6. The clutch member 35 being loose on the shaft and the member 34 being splined thereon, when these parts are engaged the clutch member 35 will be driven. This latter clutch member carries a bevel-gear 38, which is adapted to mesh with a corresponding gear 39 on the rotating spreader 40. The spreader 40 is held in the frame 33 and in a frame 41, which is fastened to the rear of the body and projects rearward and downward over the spreader. The spreader is preferably cruciform, as best shown in Fig. 2, and has a number of upwardly-projecting prongs 42, which serve to engage the material and throw it laterally to each side of the vehicle, thus enabling me to spread the material over a comparatively large area.

Projecting upwardly and slightly rearward from the rear of the body are two struts 43, located at its sides, such struts carrying a device for ejecting the material from the vehicle, such device comprising a rotary shaft 44, having radial arms 45. This shaft 44 is driven by means of belts 46, which pass over pulleys 47, fastened to the ends of the shaft, and downward around pulleys 48, carried, respectively, on the clutch members 20.

49 represents a transverse follower which is fitted in the body 10 and movable back and forth along the same—backward to push the load toward the rear or discharge end and forward to recover its position. The follower is provided with laterally-projecting ears 50, (see Fig. 4,) these ears running in longitudinal guide-grooves formed in the sides of the body 10. The follower 49, as shown in Fig. 4, is cut away at the point 49ª to accommodate the ledge or trunk 17, in which are arranged the sprocket-rollers 15. The follower is moved rearward by means of ropes or cords 51, fastened to each end thereof and extending rearwardly over guide-sheaves 52, carried in suitable brackets 53 at the rear of the wagon-body. From these sheaves 52 the ropes 51 pass forwardly around drums 54, mounted in laterally-projecting brackets 55, carried at each side of the body 10 and approximately at the middle thereof. (See Fig. 2.) These drums 54 carry clutch members 56, which work with corresponding clutch members 57, driven revolubly by means of belts 58, passing around the clutch members, and thence downward to sheaves 59, formed on the clutch members 20. (See Fig. 6.) As the vehicle moves forwardly the belts 58 drive the drums 54 and the cords 51 are gradually moved rearward, drawing with them the follower 49. Springs 60 press the clutch members 57 into engagement with the members 56, and these clutch members may be disengaged by means of cords or ropes 61, which are fastened to the clutch members and which pass around guide-sheaves 62, carried by the body 10 of the vehicle, and thence forwardly around guide-sheaves 63 at the front of the body. From the sheaves 63 the ropes 61 pass to double cranks on a shaft 64, mounted in a suitable bracket 65 at the front of the wagon-body. The shaft 64 is provided with a hand-lever 66, whereby it may be thrown from one position to another, and by manipulating this hand-lever the clutches 56 and 57 may be thrown into and out of gear. When the follower 49 has been moved rearward to the full extent of its movement, it may be returned to its forward position by means of ropes or cords 67, which are attached to the follower and run forwardly over a drum 68 at the front of the wagon-body, this drum being provided with a hand-crank 69 or other suitable means for turning it. By releasing the clutch members 57 and operating the drum 68 the follower 49 may be drawn back to its first or starting position.

In using the apparatus the body is filled with the material to be scattered or spread and the various clutches are allowed to gear, whereupon the rollers 15 of the body start turning and the follower 49 starts rearward. This gradually feeds the material to the rear of the body, and the ejector 44 45 throws the material out onto the spreader 40, which in turning rapidly scatters the material to each side and in the wake of the wagon. By this apparatus the material may be thrown a great distance to each side, and thus a large area may be covered.

Various changes in the form, proportions, and minor details of my invention may be resorted to without departing from the spirit and scope of the same. Hence I consider myself entitled to all such variations as may lie within the scope of my claims.

Having thus described my invention, I claim as new and desire to secure by Letters Patent—

1. A fertilizer-distributer, comprising a body portion, a bottom formed of continuously-turning rollers feeding the material rearward, an ejector at the rear end of the body, and a spreader on which the material is thrown by the ejector.

2. A fertilizer-distributer, comprising a body portion, means for moving the material toward the rear end thereof, an ejector at the rear end, and a horizontally-disposed cruciform spreader turning on a different vertical axis and having vertically-projected pins, said spreader receiving the material from the ejector.

3. A fertilizer-distributer, comprising a body portion, means for moving the material toward the rear end thereof, an ejector at the rear end, and a spreader on which the material is thrown by the ejector, the said ejector consisting in a horizontally-disposed revoluble shaft having radially-projected arms extending downward into the body portion, for the purpose specified, and the spreader consisting of a horizontal structure turning on a vertical axis to throw the material horizontally.

4. A fertilizer-distributer, having a body portion, means at the rear thereof for throwing out the material, a vertical follower extending from the bottom of the body portion and movable rearward, and means for imparting a continuous movement to the follower.

5. A fertilizer-distributer, having a body portion, means at the rear end thereof for throwing out the material, a bottom for the body, said bottom being formed of parallel rollers, a follower mounted in the body portion to move rearward, and means for driving the rollers and follower.

6. A fertilizer-distributer, comprising a body portion, a transverse shaft extending under the same and driven by the movement thereof, means for pushing the material rearward along the body portion, gearing for driving said means from the said shaft, an ejector mounted at the rear of the body portion to throw the material out of the same, gearing for driving the ejector from the shaft, a spreader receiving the material from the ejector, gearing for driving the spreader from the shaft, and clutch mechanism controlling the several gearings.

7. In a fertilizer-distributer, a body portion with means for throwing the material out therefrom, a follower mounted vertically in the body portion on the bottom thereof to move longitudinally through the body, a cord attached to the follower, a drum whereon the cord is wound, whereby to move the follower, gearing for driving the drum, and a clutch commanding said gearing.

8. A fertilizer-distributer, comprising a body portion, a bottom therefor, the bottom being formed of transversely-disposed rollers, means for driving said rollers, a follower moving longitudinally through the body portion, and means for driving the follower.

In testimony whereof I have signed my name to this specification in the presence of two subscribing witnesses.

JOHN A. LARSON.

Witnesses:
C. M. BJAASTAD,
THOR. M. BJAASTAD.